United States Patent
Sugihara et al.

(10) Patent No.: US 8,228,607 B2
(45) Date of Patent: Jul. 24, 2012

(54) HEAD-MOUNTED TYPE IMAGE DISPLAY DEVICE

(75) Inventors: Ryohei Sugihara, Machida (JP); Seiji Tatsuta, Hachioji (JP); Yoichi Iba, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/639,424

(22) Filed: Dec. 16, 2009

(65) Prior Publication Data

US 2010/0157432 A1 Jun. 24, 2010

(30) Foreign Application Priority Data

Dec. 18, 2008 (JP) ................................. 2008-322524

(51) Int. Cl.
*G02B 27/14* (2006.01)
*G09G 5/00* (2006.01)
(52) U.S. Cl. ............................. 359/630; 345/8
(58) Field of Classification Search .......... 359/630–634; 345/7–9
See application file for complete search history.

(56) References Cited

U.S. PATENT DOCUMENTS

| | | | | |
|---|---|---|---|---|
| 5,808,802 A | * | 9/1998 | Hur | ................................ 359/630 |
| 6,977,776 B2 | * | 12/2005 | Volkenandt et al. | .......... 359/630 |

FOREIGN PATENT DOCUMENTS

| | | |
|---|---|---|
| JP | 2003-502713 | 7/2003 |
| JP | 2006-003879 | 1/2006 |
| JP | 4876326 B2 | 2/2012 |

OTHER PUBLICATIONS

Abstract of WO 00/79329 A1, dated Dec. 28, 2000.

* cited by examiner

*Primary Examiner* — Alicia M Harrington
(74) *Attorney, Agent, or Firm* — Scully, Scott, Murphy & Presser, P.C.

(57) ABSTRACT

The present invention provides a novel head-mounted type image display device capable of displaying a lot of information with good viewability by multi-screens without impairing mobility of the device. The device comprises a plurality of eyepiece optical units 25Ru, 25Rd emitting image light to be displayed toward corresponding eye balls respectively and a head-mounting unit 11 for supporting the plurality of eyepiece optical units 25Ru, 25Rd and adapted to detachably attached to the head of an observer. The head-mounting unit 11 in a state where the unit is attached to the head of the observer supports the plurality of eyepiece optical units 25Ru, 25Rd such that an emitting optical axis of each eyepiece optical unit 25Ru, 25Rd substantially passes through the eyeball rolling center of the corresponding eyeball and, when the emitting optical axis of one eyepiece optical unit passes through a pupil of the corresponding eyeball thereof as a result of rolling of the eyes, the emitting optical axis of another eyepiece optical unit does not pass through a pupil of the corresponding eyeball thereof.

8 Claims, 16 Drawing Sheets

FIG. 3
(a)
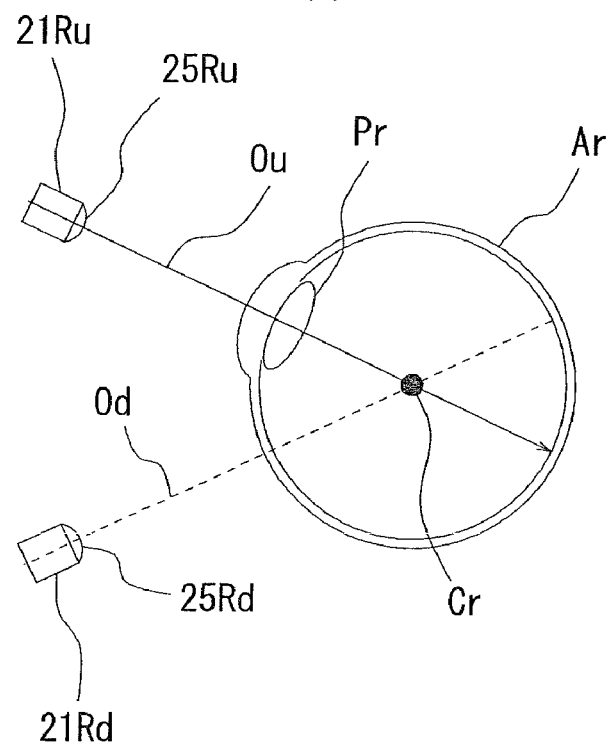
(b)
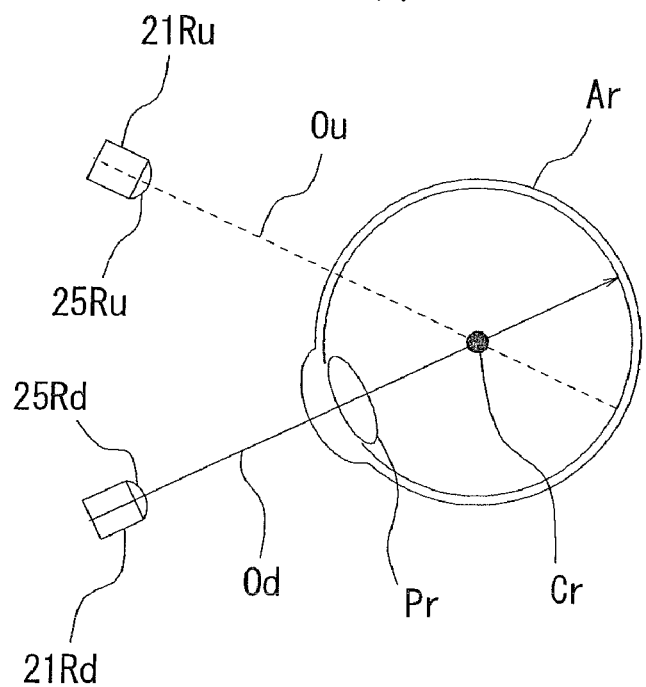

FIG. 7
(a)
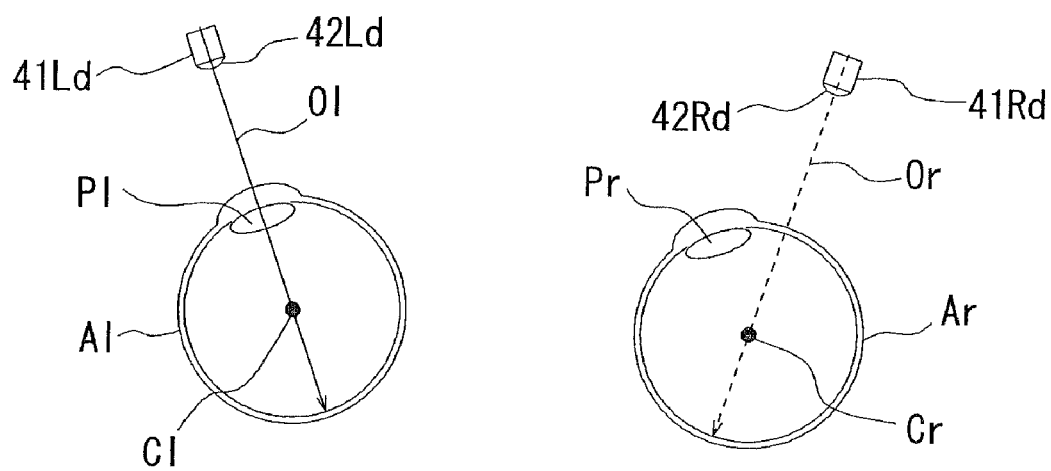
(b)
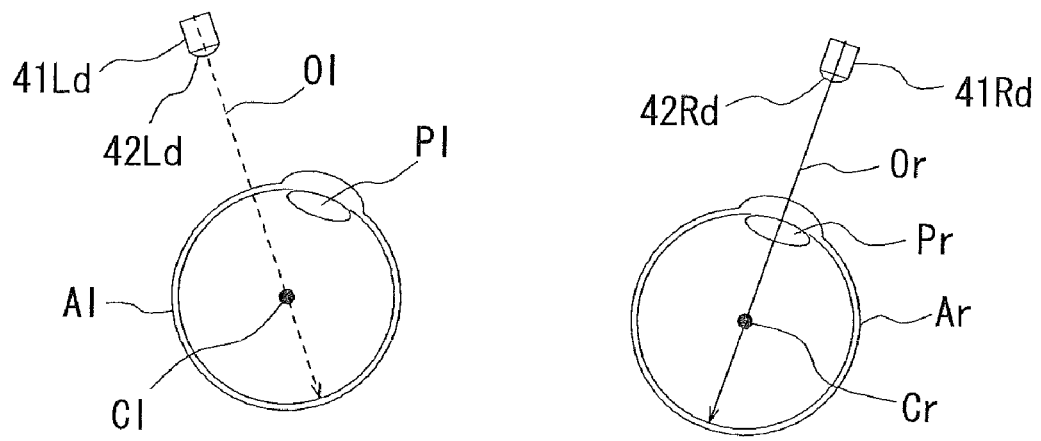

PRIOR ART

HEAD-MOUNTED TYPE IMAGE DISPLAY DEVICE

CROSS-REFERENCE TO APPLICATIONS

The present application claims the priorities of Japanese Patent Application No. 2008-322524 filed on Dec. 18, 2008, which are herein incorporated in their entirety for reference.

FIELD OF THE INVENTION

The present invention relates to a head-mounted type image display device, particularly, to a novel head-mounted type image display device capable of displaying a multi screen.

BACKGROUND OF THE INVENTION

As a conventional head-mounted type image display device, devices capable of mobile use such as head-set type devices and eyeglass type devices, for example, have been suggested (e.g. JP2003-502713A and JP2006-003879A).

FIG. 16 is a view showing a schematic structure of a conventionally proposed head-mounted type image display device, wherein FIG. 16(a) is a front view, FIG. 16(b) is a side view, and FIG. 16(c) is a plan view. This head-mounted type image display device 100 is of the type for left eye and has a head-set type head support unit 101, which is held on the left ear of an observer M, and a bar-like light guiding unit 104, which is connected to the head support unit 101 via an intermediate unit 102 and a supporting unit 103 so as to be held within the field of the left eye of the observer M. The bar-like light guiding unit 104 has an eyepiece optical unit 105 coupled to the end thereof opposite to the supporting unit 103. Moreover, a display element (not shown) such as liquid crystal display element and an organic electroluminescence display element, for displaying an image to be observed, is embedded in the head support unit 101, the intermediate unit 102 or the supporting unit 103, such that image light of an image displayed on the display element is emitted from the eyepiece optical unit 105 through the bar-like light guiding unit 104. The above-mentioned structure can be modified to reverse left and right for right eye use.

The head-mounted type image display device 100 shown in FIG. 16 is configured to allow the observer to observe an enlarged virtual image of an image displayed on the display element (not shown), by making the observer M see through the eyepiece optical unit 105 in a state where the head support unit 101 is supported on the left ear of the observer M such that the image light emitted from the eyepiece optical unit 105 is incident on the pupil of the observer M's left eye, that is, by making the visual axis of the left eye substantially coincide with the emitting optical axis of the eyepiece optical unit 105.

FIG. 17 is a perspective view showing a schematic structure of a conventionally proposed eyeglass-shaped head-mounted type image display device. This head-mounted type image display device 110 is integrated with an eyeglass, adapted for right eye use and has a bar-like light guiding unit 115, which is retained on the frame 111 of the eyeglass via a support unit 112 and a supporting unit 113 so as to be close to the front of the right eye glass lens 114 within a right eye field of an observer. The bar-like light guiding unit 115 has an eyepiece optical unit 116 coupled to the end thereof opposite to the supporting unit 113. Moreover, a display element (not shown) such as liquid crystal display element and a organic electroluminescence display element, for displaying an image to be observed, is installed in the eyeglass frame 111, support unit 112, or supporting unit 113 such that image light of an image displayed in the display element is emitted from the eyepiece optical unit 116 through the bar-like light guiding unit 115.

The head-mounted type image display device 110 shown in FIG. 17 is designed to make image light emitted from the eyepiece optical unit 116 be incident on the pupil of the observer's right eye through the right eye glass lens 114 when the observer wears the eyeglass frame 111. Thus, the observer can observe an enlarged virtual image of an image displayed on the display element (not shown), by wearing the eyeglass frame 111 and seeing through the eyepiece optical unit 116, that is, by bringing the visual axis of the right eye substantially in line with the emitting optical axis of the eyepiece optical unit 116.

In addition, as an eyeglass-shaped head-mounted type image display device, a device which is detachable to an ordinary eyeglass frame for use similar to the use of the head-mounted type image display device 110 shown in FIG. 17, has also been suggested.

There is a demand for information display that a lot of information should be displayed at the same time. However, the above-mentioned conventional head-mounted type image display device comprises only one eyepiece optical unit for emitting image light, and information is displayed on the single display screen of the single eyepiece optical unit. Besides, since the head-mounted type image display device has a relatively small display screen to allow mobile use thereof, the device can display only relatively little information. Particularly, in a case such as JP2006-003879A where a width of projection of a sectional shape in a direction of visual axis of an observer, of the eyepiece optical unit and the bar-like light guiding unit, is equal to or less than 4 mm so that the eyepiece optical unit and the bar-like light guiding unit allow the observer to have see-through vision, the display screen becomes further smaller and further less information can be displayed.

Therefore, the conventional head-mounted type image display device may not well satisfy a need to see a lot of information at the same time as in an information display.

A possible way to address such a need as described above is to provide a plurality of eyepiece optical units so that information is displayed by a multi-screen. However, simply providing a plurality of eyepiece optical units to display information by a multi-screen results in poor visibility of a display screen and deterioration of mobile-maneuverability due to juxtaposed or overlapped display images, different images being simultaneously observed by left and right eyes, respectively, and unnecessary image light being incident on the eyes, which are caused by the plurality of eyepiece optical units.

BRIEF SUMMARY OF THE INVENTION

An object of the invention contrived in view of the problems described above is to provide a novel head-mounted type image display device which can display a lot of information by a multi-screen with good viewability, without impairing mobility of the device.

In order to achieve the aforementioned object, in a first aspect of the present invention, a head-mounted type image display device comprises:

a plurality of eyepiece optical units for each emitting image light to be displayed toward a corresponding eye ball;

a head-mounting unit removably attachable to the head of an observer and adapted to hold a plurality of eyepiece optical units, wherein the head-mounting unit in a state where the unit is attached to the head of the observer supports the plurality of eyepiece optical units such that an emitting optical axis of each eyepiece optical unit substantially passes through the eyeball rolling center of the corresponding eyeball and, when the emitting optical axis of one eyepiece optical unit passes through a pupil of the corresponding eyeball thereof as a result of rolling of the eyes, the emitting optical axis of another eyepiece optical unit does not pass through a pupil of the corresponding eyeball thereof.

In a second aspect of the present invention, the head-mounted type image display device of the first aspect is characterized in that the head-mounting unit supports the plurality of eyepiece optical units such that an angle formed between the emitting optical axis of one eyepiece optical unit and the emitting optical axis of another eyepiece optical unit of the plurality of the eyepiece optical units is approximately 23 degrees or larger.

In a third aspect of the present invention, the head-mounted type image display device of the first or second aspect is characterized in that, in a state where the head-mounting unit is attached to the head of the observer, the plurality of eyepiece optical units include an upper eyepiece optical unit and an lower eyepiece optical unit, which are supported to be apart from each other in a vertical direction.

In a fourth aspect of the present invention, the head-mounted type image display device of any of the first to third aspects is characterized in that, in a state where the head-mounting unit is attached to the head of the observer, the plurality of eyepiece optical units include an eyepiece optical unit for left eye and an eyepiece optical unit for right eye, which are supported to be apart from each other in a horizontal direction.

In a fifth aspect of the present invention, the head-mounted type image display device of the fourth aspect is characterized in that the eyepiece optical unit for left eye and the eyepiece optical unit for right eye are held at different positions in a vertical direction.

In a sixth aspect of the present invention, the head-mounted type image display device of any of the first to fifth aspects is characterized in that a width of projection of a sectional shape in a direction of visual axis of the observer, of each of the plurality of eyepiece optical units, is equal to or less than 4 mm.

In a seventh aspect of the present invention, the head-mounted type image display device of any of the first to sixth aspects is characterized in that each of the plurality of eyepiece optical units is supported at an emitting end of a bar-like light guiding unit for guiding image light.

In an eighth aspect of the present invention, the head-mounted type image display device of the seventh aspect is characterized in that a width of projection of a sectional shape in a direction of visual axis of the observer, of the plurality of bar-like light guiding units, is equal to or less than 4 mm.

In a ninth aspect of the present invention, the head-mounted type image display device of any of the first to eighth aspects is characterized in that the head-mounting unit consists of an eyeglass frame.

In the present invention, the head-mounting unit in a state where the unit is attached to the head of the observer supports the plurality of eyepiece optical units such that an emitting optical axis of each eyepiece optical unit substantially passes through the eyeball rolling center of the corresponding eyeball and, when the emitting optical axis of one eyepiece optical unit passes through a pupil of the corresponding eyeball thereof as a result of rolling of the eyes, the emitting optical axis of another eyepiece optical unit does not pass through a pupil of the corresponding eyeball thereof. Accordingly, a lot of information can be displayed by a multi-screen with good viewability without impairing the mobility of the device, by displaying display screens of a plurality of eyepiece optical units as multi-screens separated from each other in a field of view and switching information to be observed by moving his eyes from one screen to another to see information.

BRIEF DESCRIPTION OF THE DRAWINGS

FIG. 3 is a view for explaining a condition required when the upper bar-like light guiding unit and the lower bar-like light guiding unit shown in FIG. 1 are held at an eyeglass frame.

FIG. 7 is a view for explaining a condition required when the lower bar-like light guiding unit for left eye and the lower bar-like light guiding unit for right eye as shown in FIG. 6 are held at an eyeglass frame.

DESCRIPTION OF THE PREFERRED EMBODIMENTS

Figure 1:
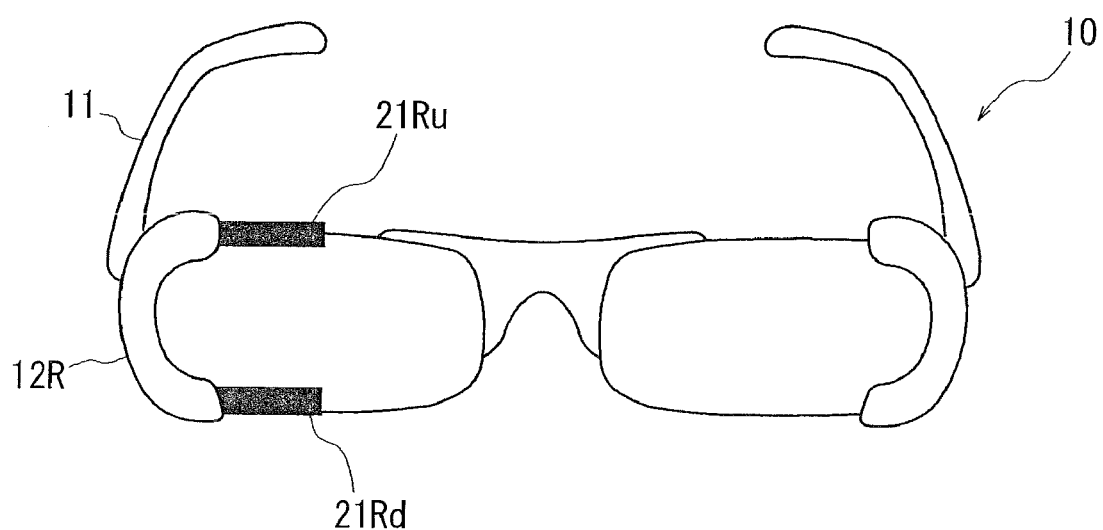
FIG. 1 is a perspective view of a schematic structure of a head-mounted type image display device according to the first embodiment of the present invention.

Hereinafter, embodiments of the present invention will be described referring to the drawings.

First Embodiment

FIG. 1 is a perspective view showing a schematic structure of a head-mounted type image display device according to the first embodiment of the present invention. The head-mounted type image display device 10 is of an eyeglass integrated type adapted for right eye use and includes, in a state the observer has worn a eyeglass frame 11 as a head-mounting unit, an upper bar-like light guiding unit 21Ru held at the upper part of a right eye rim 12R of the eyeglass frame 11 to extend within the filed of view of the right eye and a lower bar-like light guiding unit 21Rd held at the lower part of the right eye rim 12R to extend within the field of view of the right eye.

Figure 2:
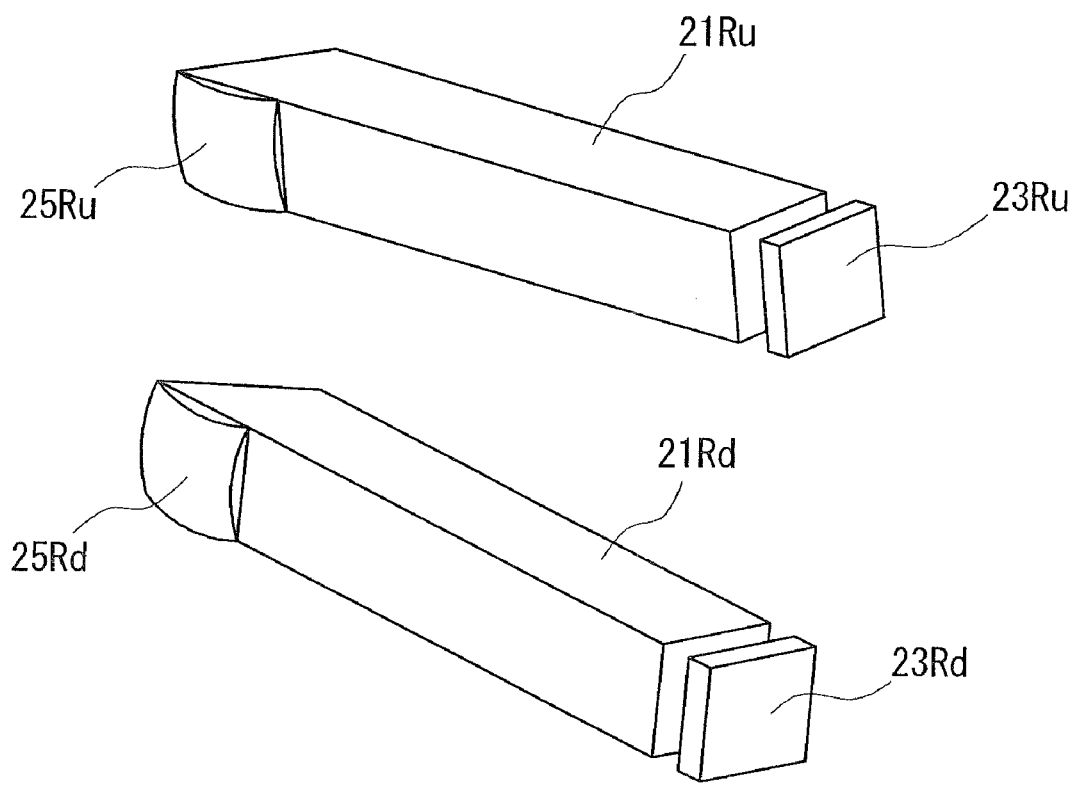
FIG. 2 is a schematic perspective view of an upper bar-like light guiding unit and a lower bar-like light guiding unit shown in FIG. 1.

The upper bar-like light guiding unit 21Ru is formed to have, for example, a rectangular cross section as shown in a schematic perspective view of FIG. 2, and holds an incident end face on one end thereof at the upper part of the right eye rim 12 such that the end face faces a displaying element 23Ru consisting of, for example, a liquid crystal display element, an organic electroluminescence display element or the like supported at the upper part of the right eye rim 12. The upper bar-like light guiding unit 21Ru guides image light of an image displayed on the displaying element 23Ru from the incident end face to the other end portion thereof, and emits the light from a side face after making the light be reflected toward the side of the observer's eyeball at the other end portion. The emitting portion for image light of the upper bar-like light guiding 21Ru supports an upper eyepiece optical unit 25Ru consisting of an eyepiece lens with a curvature corresponding to a virtual image position at which an image generated by the image light is to be displayed.

Similarly, the lower bar-like light guiding unit 21Rd is formed to have, for example, a rectangular cross section as shown in a schematic perspective view of FIG. 2, and holds an incident end face on one end thereof at the lower part of the right eye rim 12 such that the end face faces a displaying element 23Rd consisting of for example, a liquid crystal display element, an organic electroluminescence display element or the like supported at the lower part of the right eye rim 12. The lower bar-like light guiding unit 21Rd guides image light of an image displayed on the displaying element 23Rd from the incident end face to the other end portion thereof, and emits the light from a side face after making the light be reflected toward the side of the observer's eyeball at the other end portion. The emitting portion for image light of the lower bar-like light guiding 21Rd supports a lower eyepiece optical unit 25Rd consisting of an eyepiece lens with a curvature corresponding to a virtual image position at which an image generated by the image light is to be displayed. In addition, the distance between the upper eyepiece optical unit 25Ru and the displaying position of image corresponding thereto and the distance between a lower eyepiece optical unit 25Rd and the displaying position of image corresponding thereto are configured to be substantially equal to each other in the present embodiment. Accordingly, the curvatures of eyepiece lenses, which form the upper eyepiece optical unit 25Ru and the lower eyepiece optical unit 25Rd, respectively, are substantially equal.

As shown in the FIGS. 3(a) and (b), in the state where the observer wears the eyeglass frame 11, the upper bar-like light guiding unit 21Ru and the lower bar-like light guiding unit 21Rd are retained at the eyeglass frame 11 to be apart from each other in the vertical direction such that the emitting optical axis Ou of the upper side eyepiece optical unit 25Ru and the emitting optical axis Od of the lower side eyepiece optical unit 25Rd intersect each other at the eyeball rolling center Cr of the right eyeball Ar of the observer and, when the emitting optical axis of one of the eyepiece optical units 25Ru, 25Rd passes through a pupil Pr of the right eyeball Ar, the emitting optical axis of the other eyepiece optical unit 25Rd, 25Ru does not pass through a pupil Pr of the right eyeball Ar.

Specifically, the upper bar-like right guiding 21Ru and the lower bar-like right guiding 21Rd are retained at the eyeglass frame 11, such that the emitting optical axis Ou of the upper eyepiece optical unit 25Ru passes through the pupil Pr of the right eyeball Ar and the emitting optical axis Od of the lower eyepiece optical unit 25Rd does not pass through the pupil Pr of the right eyeball Ar when the observer has moved his/her eyesight toward an upper right area within his/her field of view and is looking at the upper right area as shown in FIG. 3(a), while the emitting optical axis Od of the lower eyepiece optical unit 25Rd passes through the pupil Pr of the right eyeball Ar and the emitting optical axis Ou of the upper eyepiece optical unit 25Ru does not pass through the pupil Pr of the right eyeball Ar when the observer has moved his/her eyesight toward a lower right area within his/her field of view and is looking at the lower right area as shown in FIG. 3(b).

Figure 4:
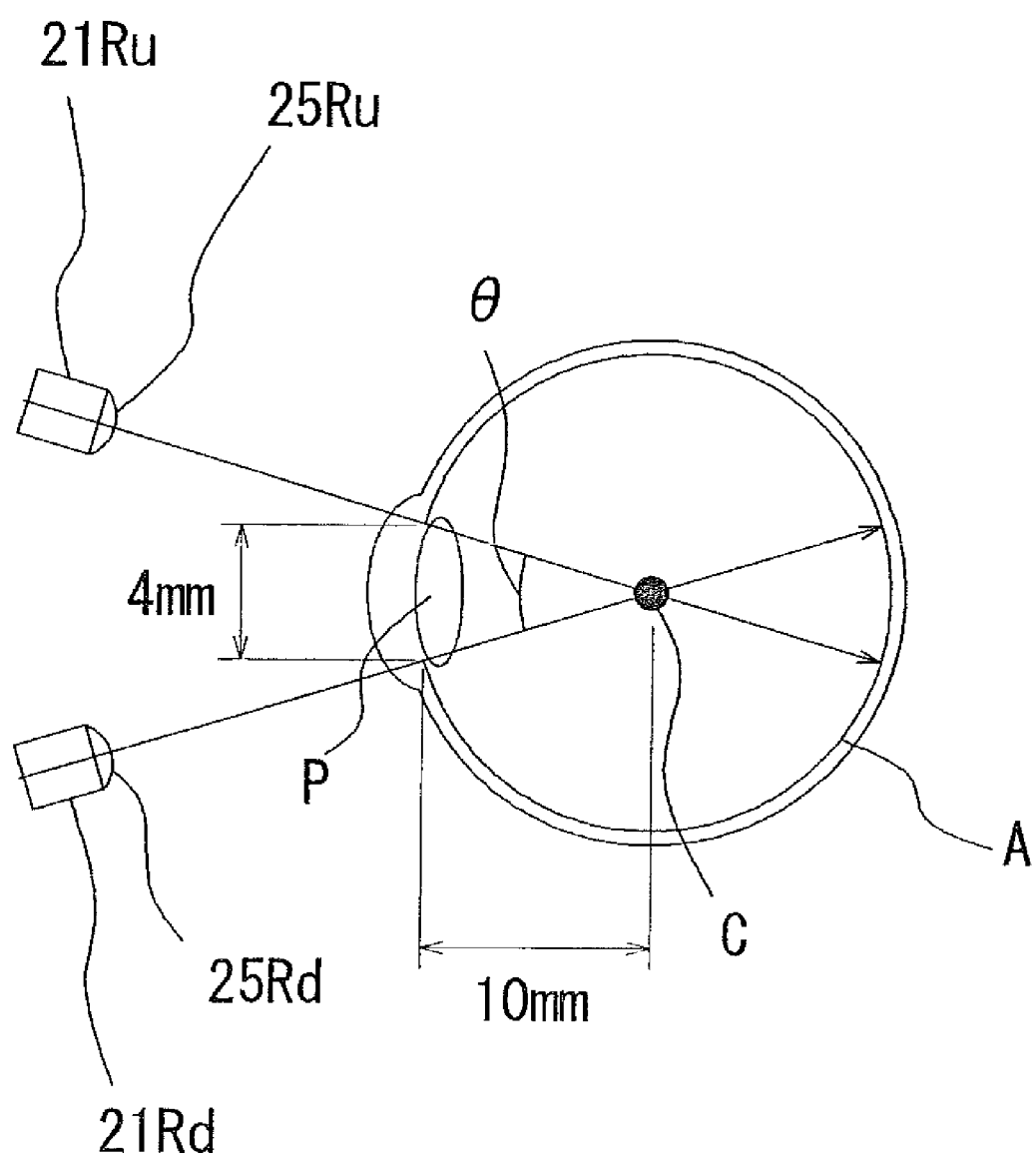
FIG. 4 is a view for explaining an angle between the emitting optical axes of the upper eyepiece optical unit and the lower eyepiece optical unit shown in FIG. 2.

As shown in FIG. 4, it generally assumed that the diameter of a pupil P of a human eyeball A in a normal environment is approximately 4 mm. Further, the distance from the pupil P to the eyeball rolling center C is generally 10 mm. Thus, in order to satisfy the requirements described above, the upper bar-like light guiding unit 21Ru and lower bar-like light guiding unit 21Rd are retained at the eyeglass frame 11 to face inward respectively, as shown in FIG. 2, such that the angle θ between the emitting optical axis Ou of the upper eyepiece optical unit 25Ru and the emitting optical axis Od of the lower eyepiece optical unit 25Rd is approximately 23 degrees or larger.

Further, as shown in FIG. 3(a), the width of projection of a sectional shape in a direction of visual axis of the right eyeball Ar, of the upper bar-like light guiding unit 21Ru and the upper eyepiece optical unit 25Ru, is equal to or less than 4 mm, so that the upper bar-like light guide 21Ru and the upper eyepiece optical unit 25Ru become see-through to allow the observer to see the surroundings when the observer look at the upper right area of his/her field of view. Similarly, as shown in FIG. 3 (b), the width of projection of a sectional shape in a direction of visual axis of the right eyeball Ar, of the lower bar-like light guiding unit 21Rd and the lower eyepiece optical unit 25Rd, is equal to or less than 4 mm, so that the lower bar-like light guide 21Rd and the lower eyepiece optical unit 25Rd become see-through to allow the observer to see the surroundings when the observer look at the lower right area of his/her field of view.

Figure 5:
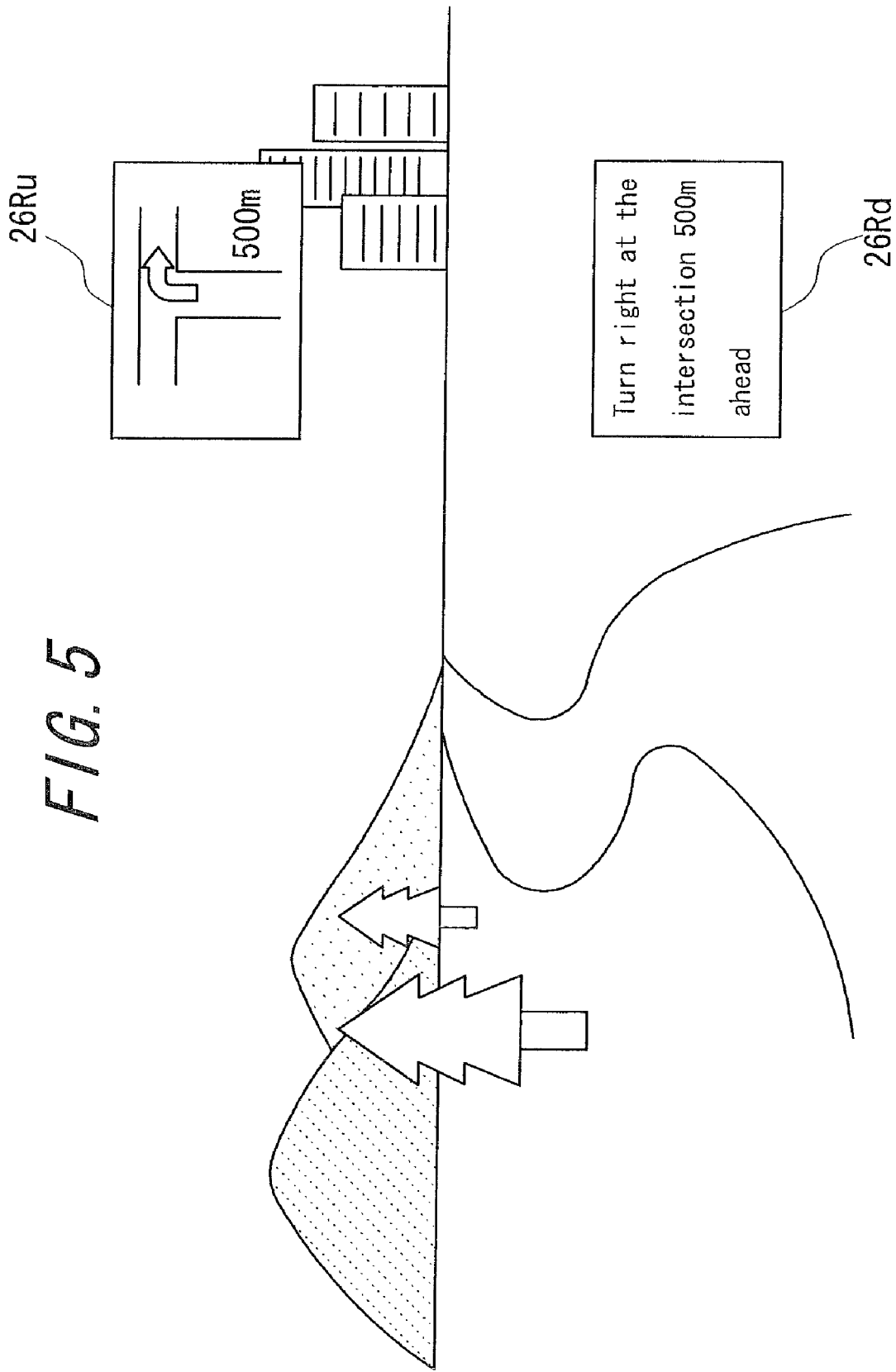
FIG. 5 is a view showing displaying positions of the display screens within the field of view provided by the head-mounted type image display device according to a first embodiment.

In this way, as shown in FIG. 5, a upper display screen 26Ru is displayed on the upper right of the observer's field of view, which upper display screen 26Ru is generated by image light guided by the upper bar-like light guiding unit 21Ru and emitted from the upper eyepiece optical unit 25Ru, and a lower display screen 26Rd is displayed on the lower right of the observer's field of view, separately from the upper display screen 26Ru, which lower display screen 26Rd is generated by an image light guided by the lower bar-like light guiding unit 21Rd and emitted from the lower eyepiece optical unit 25Rd. Required information is displayed in each of the display screens.

Therefore, according to the present embodiment, the observer can recognize in a state where the observer is casting his/her eyesight on the front that the upper displaying screen 26Ru and the lower displaying screen 26Rd are displayed separately within his/her field of view. Then, when the observer has moved his/her eyesight to the upper right and is looking at the upper right portion of his/her field of view, the observer can see information displayed on the upper display screen 26Ru with his/her right eyeball Ar because the emitting optical axis Ou of the upper eyepiece optical unit 25Ru passes through the pupil Pr of the right eyeball Ar, as shown in FIG. 3(a). Besides, in this situation, incidence of unnecessary image light can be decreased because the emitting optical axis Od of the lower eyepiece optical unit 25Rd does not pass through the pupil Pr of the right eyeball Ar.

Similarly, when the observer has moved his/her eyesight to the lower right and is looking at the lower right portion of his/her field of view, the observer can see information displayed on the lower display screen 26Rd with his/her right eyeball Ar because the emitting optical axis Od of the lower eyepiece optical unit 25Rd passes through the pupil Pr of the right eyeball Ar, as shown in FIG. 3(b). Besides, in this situation, incidence of unnecessary image light can be decreased because the emitting optical axis Ou of the upper eyepiece optical unit 25Ru does not pass through the pupil Pr of the right eyeball Ar.

According to the present embodiment, a lot of information can be displayed by multi-screens with good viewability without impairing the mobility of the device because the upper display screen 26Ru and the lower display screen 26Rd generated by the upper eyepiece optical unit 25Ru and the lower eyepiece optical unit 26Rd are displayed within the observer's field of view as multi-screens which are separated from each other so that the observer can switchingly see one screen to another to observe information by moving his/her eyesight between upper right and lower right.

Second Embodiment

Figure 6:
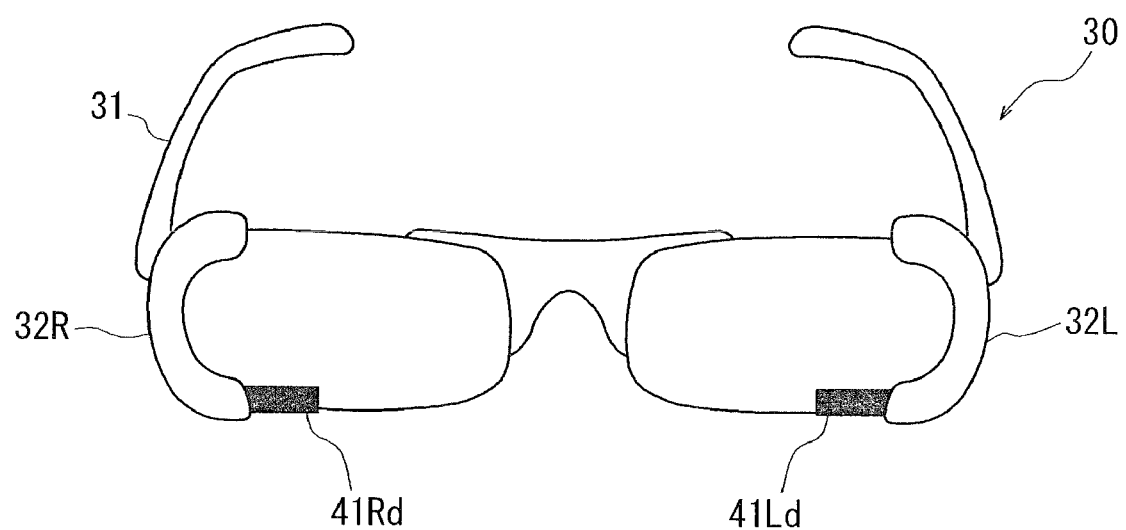
FIG. 6 is a perspective view showing a schematic structure of a head-mounted type image display device according to a second embodiment of the present invention.

FIG. 6 is a perspective view showing a schematic structure of a head-mounted type image display device according to a second embodiment of the present invention. This head-mounted type image display device 30 is of eyeglass integrated type and includes, in a state where the observer wears a eyeglass frame 31 as a head-mounting unit, a lower bar-like light guiding unit 41Ld for left eye held at the lower part of a left eye rim 32L of the eyeglass frame 31 to extend within the filed of view of the left eye and a lower bar-like light guiding unit 41Rd held at the lower part of the right eye rim 32R of the eyeglass frame 31 to extend within the field of view of the right eye.

The lower bar-like light guiding unit for left eye 41Ld and the lower bar-like light guiding unit for right eye 41Rd each guide image light of an image displayed on the displaying element from the incident end face to the other end thereof and respectively emit the light via a lower eyepiece optical unit for left eye 42Ld and a lower eyepiece optical unit for right eye 42Rd (see FIGS. 7 and 8) retained at side faces of the units 41Ld, 41Rd after making the light be reflected toward the side of the observer's eyeball at the other end portion.

As shown in the FIGS. 7(a) and (b), the lower bar-like light guiding unit for left eye 41Ld and the lower bar-like light guiding unit for right eye 41Rd are retained to be apart from each other in the horizontal direction such that, in a state where the observer wears the eyeglass frame 31, the emitting optical axis Ol of the lower eyepiece optical unit for left eye 42Ld substantially passes through the eyeball rolling center Cl of the left eyeball of the observer, the emitting optical axis Or of the lower eyepiece optical unit for right eye 42Rd substantially passes through the eyeball rolling center Cr of the right eyeball of the observer and, when the emitting optical axis of one of the eyepiece optical units 42Ld and 42Rd passes through a pupil of the corresponding eyeball thereof, the emitting optical axis of the other eyepiece optical unit 42Rd and 42Ld does not pass through a pupil of the corresponding eyeball thereof.

Specifically, the lower bar-like light guiding unit for left eye 41Ld and the lower bar-like light guiding unit for right eye 41Rd are retained at the eyeglass frame 31 such that the emitting optical axis Ol of the lower eyepiece optical unit for left eye 42Ld passes through the pupil Pl of the left eyeball Al and the emitting optical axis Or of the lower eyepiece optical unit for right eye 42Rd does not pass through the pupil Pr of the right eyeball Ar when the observer has moved his/her eyesight toward an lower left area within his/her field of view and is looking at the lower left area as shown in FIG. 7(a), while the emitting optical axis Or of the lower eyepiece optical unit for right eye 42Rd passes through the pupil Pr of the right eyeball Ar and the emitting optical axis Ol of the lower eyepiece optical unit for left eye 42Ld does not pass through the pupil Pl of the right eyeball Al when the observer has moved his/her eyesight toward a lower right area within his/her field of view and is looking at the lower right area as shown in FIG. 7(b).

Figure 8:
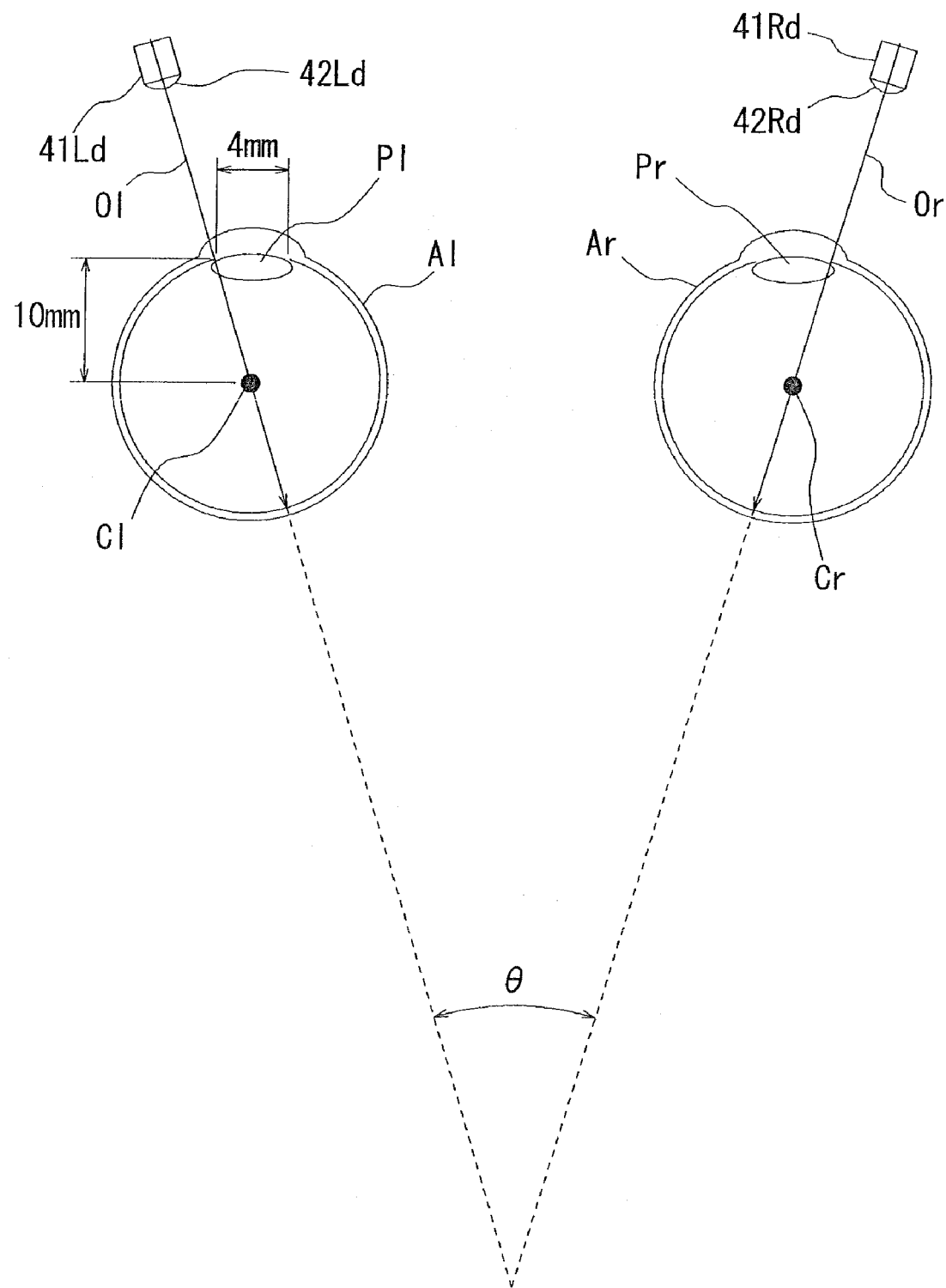
FIG. 8 is a view for explaining an angle between the emitting optical axes of the lower eyepiece optical unit for left eye and the lower eyepiece optical unit for right eye as shown in FIG. 7.

As mentioned referring to FIG. 4, the diameter of a pupil of the human eyeball in a normal environment is approximately 4 mm, and the distance from the pupil to the eyeball rolling center C is approximately 10 mm. The maximum angle between the visual axis and the emitting optical axis passing through the pupil is approximately 11.3 degrees in each eyeball, as is the case shown in FIG. 4. Accordingly, in order to satisfy the condition above, as shown in FIG. 8, the lower bar-like light guiding unit for left eye 41Ld and the lower bar-like light guiding unit for right eye 41Rd are retained at the eyeglass frame 31 such that the angle θ formed between the emitting optical axis Ol of the lower eyepiece optical unit for left eye 42Ld and the emitting optical unit Or of the lower eyepiece optical unit for right eye 42Rd is approximately 23 degrees or larger, similar to the case in FIG. 4.

Further, as in the first embodiment, the width of projection of a sectional shape in a direction of visual axis of the left eyeball Al, of the lower bar-like light guiding unit for left eye 41Ld and the lower eyepiece optical unit for left eye 42Ld, is equal to or less than 4 mm, so that the lower bar-like light guiding unit for left eye 41Ld and the lower eyepiece optical unit for left eye 42Ld become see-through to allow the observer to see the surroundings when the observer looks at the lower left area of his/her field of view, as shown in FIG. 7(a). Similarly, as shown in FIG. 7(b), the width of projection of a sectional shape in a direction of visual axis of the right eyeball Ar, of the lower bar-like light guiding unit for right eye 41Rd and the lower eyepiece optical unit for right eye 42Rd, is equal to or less than 4 mm, so that the lower bar-like light guiding unit for right eye 41Rd and the lower eyepiece optical unit for right eye 42R become see-through to allow the observer to see the surroundings when the observer looks at the lower right area of the field of view.

Figure 9:
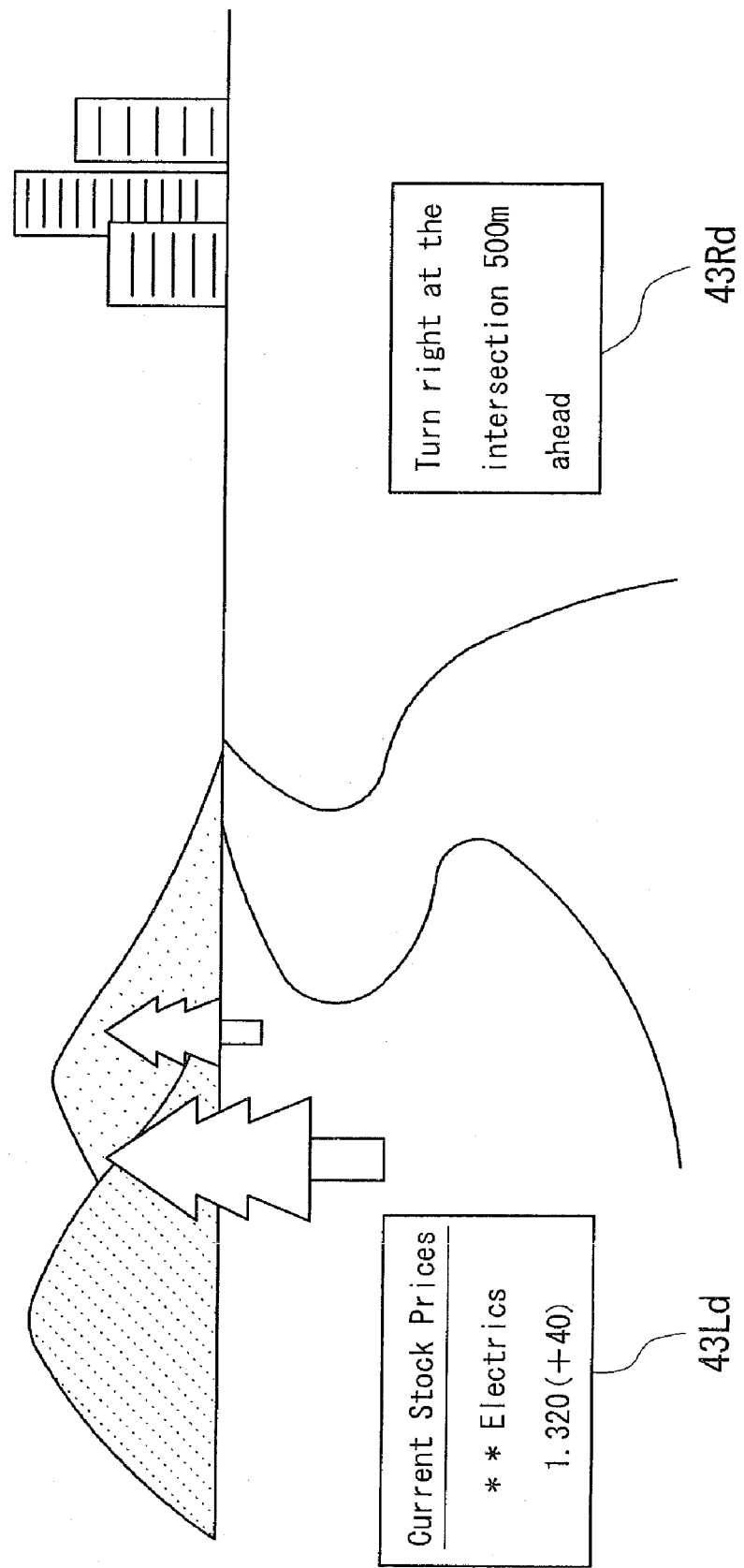
FIG. 9 is a view showing displaying positions of the display screens within the field of view provided by the head-mounted type image display device according to the second embodiment.

In this way, as shown in FIG. 9, a lower left display screen 43Ld is displayed on the lower left of the observer's field of view, which lower left display screen 43Ld is generated by a image light guided by the lower bar-like light guiding unit for left eye 41Ld and emitted from the lower eyepiece optical unit for left eye 42Ld, and a lower right display screen 43Rd is displayed on the lower right of the observer's field of view, separately form the lower left display screen 43Ld, which lower right display screen 43Rd is generated by an image light guided by the lower bar-like light guiding unit for right eye 41Rd and emitted from the lower eyepiece optical unit for right eye 42Rd. Required information is displayed in each of the display screens.

Therefore, according to the present embodiment, the observer can recognize that the lower left displaying screen 43Ld and the lower right displaying screen 43Rd are displayed separately within his/her field of view, while casting his/her eyesight (visual axis) straight on the front. Then, when the observer moves his/her eyesight to the lower left to look at the lower left area in the field of view, the observer can see information displayed on the lower left display screen 43Ld with his left eyeball Al because the emitting optical axis Ol of the lower eyepiece optical unit for left eye 42Ld passes through the pupil Pl of the left eyeball Al, as shown in FIG. 7(a). Besides, in this situation, observation of the lower left display screen 43Ld is not disturbed because the emitting optical axis Or of the lower eyepiece optical unit for right eye 42Rd does not pass through the pupil Pr of the right eyeball Ar.

Similarly, when the observer moves his/her eyesight to the lower right to look at the lower left area in the field of view, the observer can see information displayed on the lower right display screen 43Rd with his right eyeball Ar because the emitting optical axis Or of the lower eyepiece optical unit for right eye 42Rd passes through the pupil Pr of the right eyeball Ar, as shown in FIG. 7(b). Besides, in this situation, observation of the lower right display screen 43Rd is not disturbed because the emitting optical axis Ol of the lower eyepiece optical unit for left eye 42Ld does not pass through the pupil Pl of the right eyeball Al.

According to the present embodiment, a lot of information can be displayed with good viewability in multi-screens without impairing the mobility or mobile-maneuverability of the device as in the first embodiment because the lower left display screen 43Ld and the lower right display screen 43Rd generated by the lower eyepiece optical unit for left eye 42Ld and the lower eyepiece optical unit for right eye 42Rd are displayed as multi-screens separated from each other within the observer's field of view so that the observer can switch a screen to be observed and observe information by moving his/her eyesight between upper (lower) left or lower right as described above.

Third Embodiment

Figure 10:
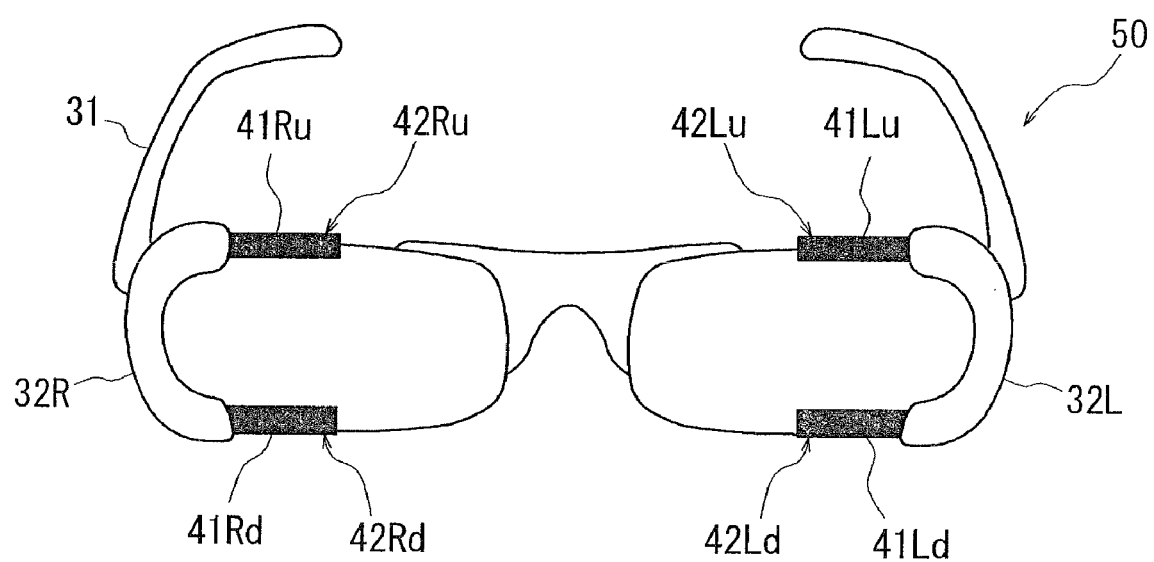
FIG. 10 is a perspective view of a schematic structure of a head-mounted type image display device according to a third embodiment of the present invention.

FIG. 10 is a perspective view showing a schematic structure of a head-mounted type image display device according to a third embodiment of the present invention. This head-mounted type image display device 50 is different from the head-mounted type image display device 30 of the second embodiment, in that the former is further provided with a upper bar-like light guiding unit for left eye 41Lu extending within the field of view of the left eye and a upper bar-like light guiding unit for right eye 41Ru extending within the field of view of the right eye retained at the upper portions of left eye rim 32L and the right eye rim 32R of the eyeglass frame 31, respectively, such that these four bar-like light guiding units are positioned apart from each other in both the horizontal and vertical directions.

The upper bar-like light guiding unit for left eye 41Lu and the upper bar-like light guiding unit for right eye 41Ru each guide image light of an image displayed on the displaying element corresponding thereto from the incident end face to the other end portion thereof and respectively emit the light via an upper eyepiece optical unit for left eye 42Lu and an upper eyepiece optical unit for right eye 42Ru retained at side faces of the units 41Lu, 41Ru after making the light be reflected toward the side of the observer's eyeball at the other end portion.

In addition, the upper bar-like light guiding unit for left eye 41Lu and the upper bar-like light guiding unit for right eye 41Ru are supported to the eyeglass frame 31 such that, in a state where the observer wears the eyeglass frame 31, the emitting optical axis of the upper eyepiece optical unit for left eye 42Lu intersects with the emitting optical axis of the lower eyepiece optical unit for left eye 42Ld substantially at the eyeball rolling center of an observer's left eyeball and the emitting optical axis of the upper eyepiece optical unit for right eye 42Ru intersects with the emitting optical axis of the lower eyepiece optical unit for the right eye 42Rd substantially at the eyeball rolling center of the observer's right eyeball.

More particularly, an angle formed between the emitting optical axis of the upper eyepiece optical unit for left eye 42Lu and the emitting optical axis of the upper eyepiece optical unit for right eye 42Ru on the upper portion is approximately 23 degrees or larger, similar to the angle formed between the emitting optical axis of the lower eyepiece optical unit for left eye 42Ld and the emitting optical axis of the lower eyepiece optical unit for right eye 42Rd at the lower portion. Further, the angle formed between the emitting optical axes on the upper and lower left, that is, the angle formed between the emitting optical axis of the upper eyepiece optical unit for left eye 42Lu and the emitting optical axis of lower eyepiece optical unit for left eye 42Ld, and the angle formed between the emitting optical axes of the upper and lower right, that is, the angle formed between the emitting optical axis of the upper eyepiece optical unit for right eye 42 Ru and the emitting optical axis of the lower eyepiece optical unit for right eye 42Rd, are approximately 23 degrees or larger, respectively, as described in the first embodiment. Similarly, the angles formed between the emitting optical axes positioned diagonally, i.e., the angle between the emitting optical axis of the upper eyepiece optical unit for left eye 42Lu and the emitting optical axis of the lower eyepiece optical unit for right eye 42Rd and the angle between the emitting optical axis of the upper eyepiece optical unit for right eye 42 Ru and the emitting optical axis of the lower eyepiece optical unit for left eye 42Ld, are approximately 23 degrees or larger, respectively, as described in the first embodiment.

Accordingly, when an observer wears the eyeglass frame 31 and moves his/her eyesight such that the emitting optical axis of at least one of the eyepiece optical units passes through the pupil of the corresponding eyeball, the emitting optical axes of other eyepiece optical units are prevented from passing through the pupil of the corresponding eyeballs, respectively.

Further, the widths of projection of sectional shapes in a direction of visual axis of each corresponding eyeball, of the upper bar-like light guiding unit for left eye 41Lu, the upper eyepiece optical unit for left eye 42Lu, upper bar-like light guiding unit for right eye 41Ru, and the upper eyepiece optical unit for right eye 42Ru, are equal to or less than 4 mm, as is the cases with the lower bar-like light guiding unit for left eye 41Ld, lower eyepiece optical unit for left eye 42Ld, the lower bar-like light guiding unit for right eye 41Rd and lower eyepiece optical unit for right eye 42Rd.

Figure 11:
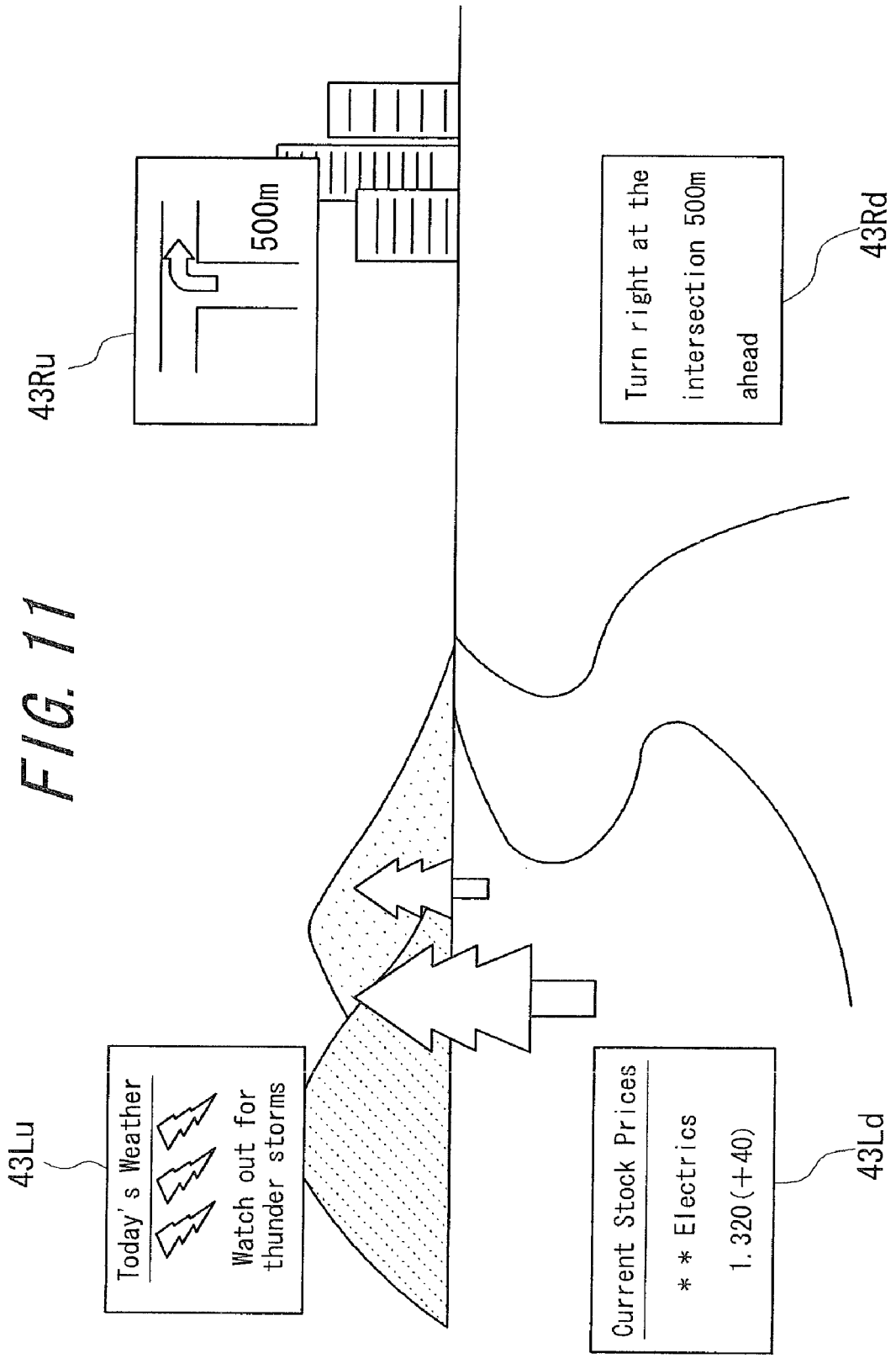
FIG. 11 is an illustration of displaying position of the display screen within the field of view held by the head-mounted type image display device according to the third embodiment.

In this way, as shown in FIG. 11, in the observer's field of view, in addition to the lower left display screen 43Ld and lower right display screen 43Rd of FIG. 9, provided respectively by the lower eyepiece optical unit for left eye 42Ld and lower eyepiece optical unit for right eye 42Rd, an upper left display screen 43Lu provided by image light guided by the upper bar-like light guiding unit for left eye 41Lu and emitted from the upper eyepiece optical unit for left eye 42Lu is displayed on the upper left area in the field of view, and an upper right display screen 43Ru provided by image light guided by the upper bar-like light guiding unit for right eye 41Ru and emitted from the upper eyepiece optical unit for right eye 42Ru is displayed on the upper right area in the field of view, separately from the upper left display screen 43Lu. Required information is displayed in each of these screens.

As a result, according to the present embodiment, the observer can recognize in a state his/her eyesight (visual axis) is cast straight on the front that four display screens are displayed separately from each other in the vertical and horizontal direction in his/her field of view. Then, when the observer moves eyesight to look at the upper left area of the field of view, the observer can see information displayed on the upper left display screen 43Lu with the left eyeball because the emitting optical axis of the upper eyepiece optical unit for left eye 42Lu passes through the pupil of the left eyeball, and when the observer looks at the upper right area of the field of view, the observer can see information displayed on the upper right display screen 43Ru because the emitting optical axis of the upper eyepiece optical unit for right eye 42Ru passes through the pupil of the right eyeball. Further, when the observer looks at the lower right or the lower left of the field of view, the observer can see information displayed on either the lower left display screen 43Ld or the lower right display screen 43Rd with his right or left eyeball as described in the second embodiment.

Besides, in the situation where the observer casts his/her eyesight on one display screen provided by either one of the eyepiece optical units, observation of the one display screen on which eyesight is being cast is not disturbed because other emitting optical axes of other eyepiece optical units do not pass through the pupils of the corresponding eyeballs thereof.

According to the present embodiment, more information can be displayed with good viewability in multi-screens without impairing the mobility or mobile-maneuverability of the device than embodiments mentioned above because the four display screens 43Lu, 43Ld, 43Ru, and 43Rd, provided respectively by the four eyepiece optical units 42Lu, 42Ld, 42Ru, and 42Rd spaced from each other in vertical and horizontal directions, are displayed within the field of view as multi-screens apart from each other in vertical and horizontal directions such that the observer can switch a screen to be observed and observe information by moving his/her eyesight vertically and horizontally.

Figure 12:
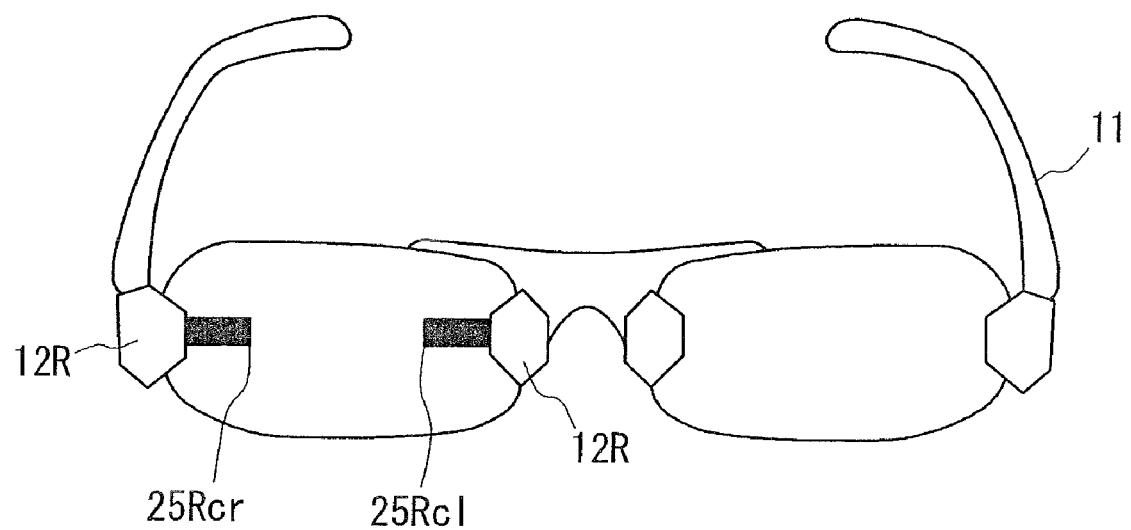
FIG. 12 is an explanatory view of a modified example of the head-mounted type image display device according to the present invention.
Figure 13:
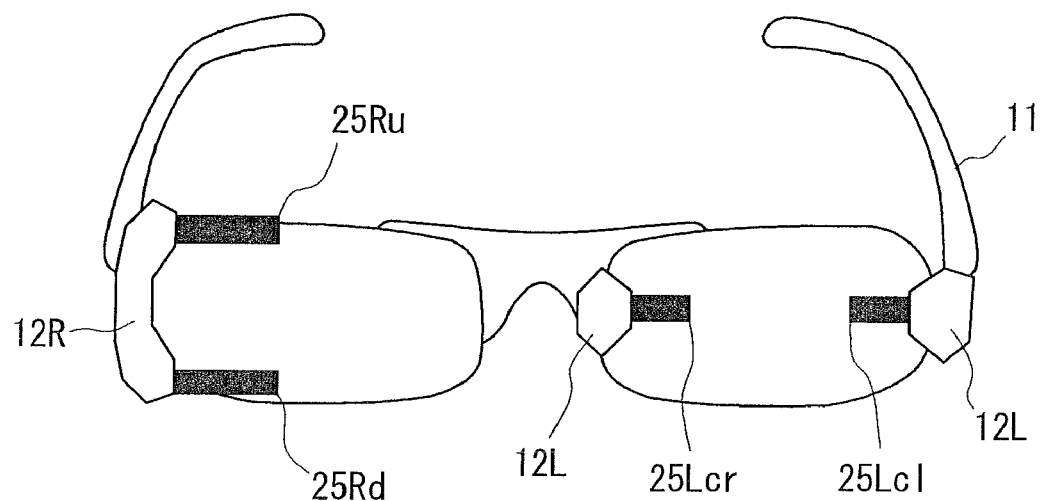
FIG. 13 is an explanatory view of another modified example of the head-mounted type image display device according to the present invention.

The present invention is not limited to the embodiments above and various changes and modifications can be applied. For example, although the device is configured as a right eye type device supporting the eyepiece optical units respectively at the upper and lower portions of the right eye rim of the eyeglass frame in the first embodiment, the same configuration can be applied to left eye rim so as to configure the device as the left eye type. Further, as shown in FIG. 12, the head-mounted type image display device can be structured such that a right hand side eyepiece optical unit for right eye 25Rcr and left hand side eyepiece optical unit for right eye 25Rcl are supported respectively at the middle portion of the right hand side rim portion and the middle portion of the left hand side rim portion of one of the rims (the right eye rim 12R, in FIG. 12) of the eyeglass frame 11. Alternatively, as shown in FIG. 13, in order to arrange the eyepiece optical unit for left eye and the eyepiece optical unit for right eye in different positions in the vertical direction, the head-mounted type image display device can be structured such that, in addition to the structure as shown in FIG. 1, a right hand side eyepiece optical unit for left eye 25Lcr and a left hand side eyepiece optical unit for left eye 25Lcl are retained at the middle portion of the right hand side rim portion and the middle portion of the left hand side rim portion of the left eye side-rim 12L. By disposing the eyepiece optical unit for left eye and the eyepiece optical unit for right eye are arranged in different positions in the vertical direction, the observer can effect easy switching between visual recognition by his/her left eye and visual recognition by his/her right eye because the height positions at which the eyes move are different between when the observer looks at a display screen provided by the eyepiece optical unit for left eye and when the observer looks at a display screen provided by the eyepiece optical unit for right eye.

Further, although the head-mounted type image display device is configured as that of lower area observation type supporting the eyepiece optical units on the bottom of the right and left rims of the eyeglass frame in the second embodiment, the device can be configured as the front area observation type supporting the eyepiece optical units respectively on the vertically middle portion of the right and left rims, or as the upper area observation type supporting the eyepiece optical units respectively on the upper part of the right and left rims. Alternatively, the head-mounted type image display device can be configured such that the eyepiece optical unit for left eye and the eyepiece optical unit for right eye are disposed at different positions in the vertical direction, respectively, for example, as a diagonal observation type supporting an eyepiece optical unit at the upper/lower portion of one rim and another eyepiece optical unit at the lower/upper portion of the other rim, or as an observation type supporting an eyepiece optical unit at the upper/lower portion of one rim and another eyepiece optical unit at the vertically middle portion of the other rim. Accordingly, in these modified examples, as in the structure shown in FIG. 13, the observer can effect easy switching between visual recognition by his/her left eye and visual recognition by his/her right eye because the height positions at which the eyes move are different between when the observer looks at a display screen provided by the eyepiece optical unit for left eye and when the observer looks at a display screen provided by the eyepiece optical unit for right eye.

Figure 14:
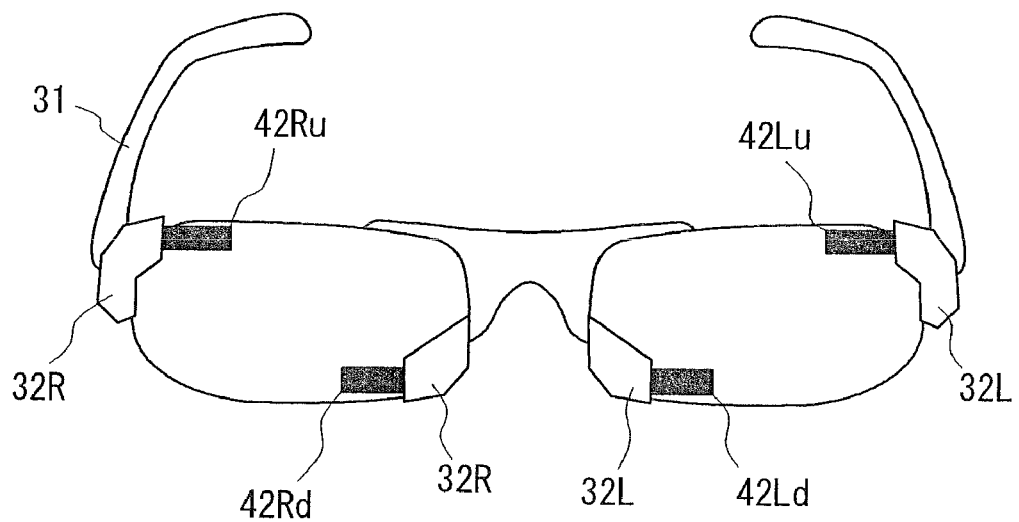
FIG. 14 is an explanatory view of yet another modified example of the head-mounted type image display device according to the present invention.

Further, in the third embodiment, although the eyepiece optical units 42Lu, 42Ld, 42Ru, 42Rd are supported at four places, that is, the upper and lower left of the left eye rim 32L and the upper and lower right of the right eye rim 32R, of the eyeglass frame 31, two eyepiece optical units may be supported diagonally at each rim. For example, as shown in FIG. 14, the head-mounted type image display device can be configured to support the upper eyepiece optical unit for left eye 42Lu on the upper left of the left eye rim 32L, the lower eyepiece optical unit for left eye 42Ld on the lower right of the left eye rim 32L, the upper eyepiece optical unit for right eye 42Ru on the upper right of the right eye rim 32R and the lower eyepiece optical unit for right eye 42Rd on the lower left of the right eye rim 32R. Further, with regard to the constitution in the third embodiment, either one of the eyepiece optical units can be omitted, or additional eyepiece optical units can be provided to satisfy the above mentioned angle condition with respect to the emitting optical axes of other eyepiece optical units. Yet further, in the aforementioned cases, the eyepiece optical units for left eye and the eyepiece optical units for right eye may be arranged in different positions in the vertical direction as descried above.

Figure 15:
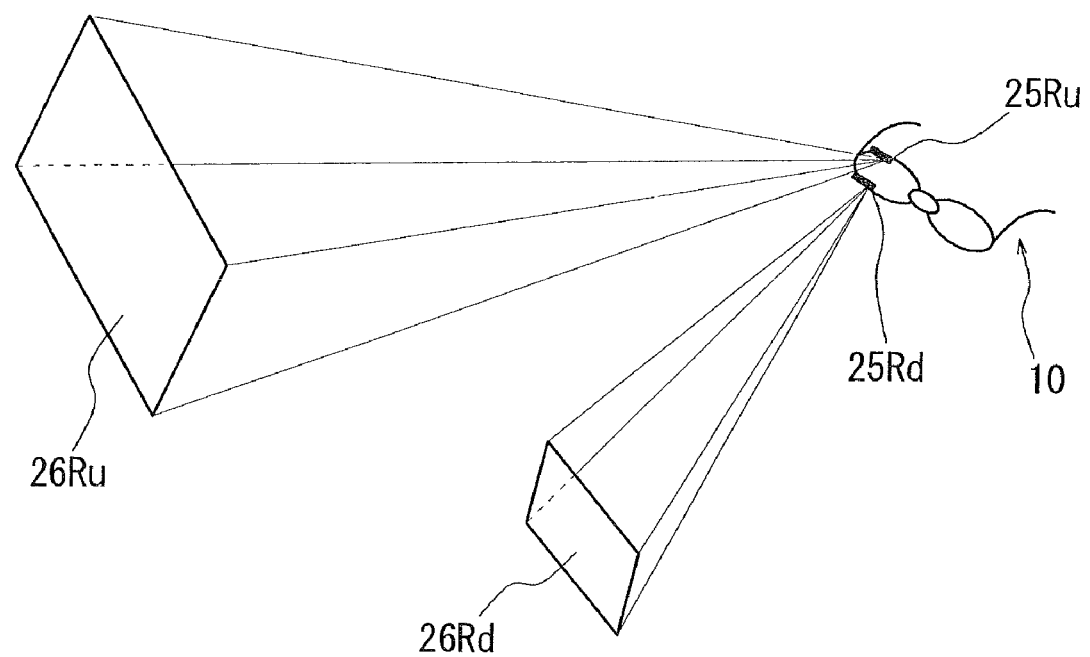
FIG. 15 is an explanatory view of yet another modified example of the head-mounted type image display device according to the present invention.
Figure 16:
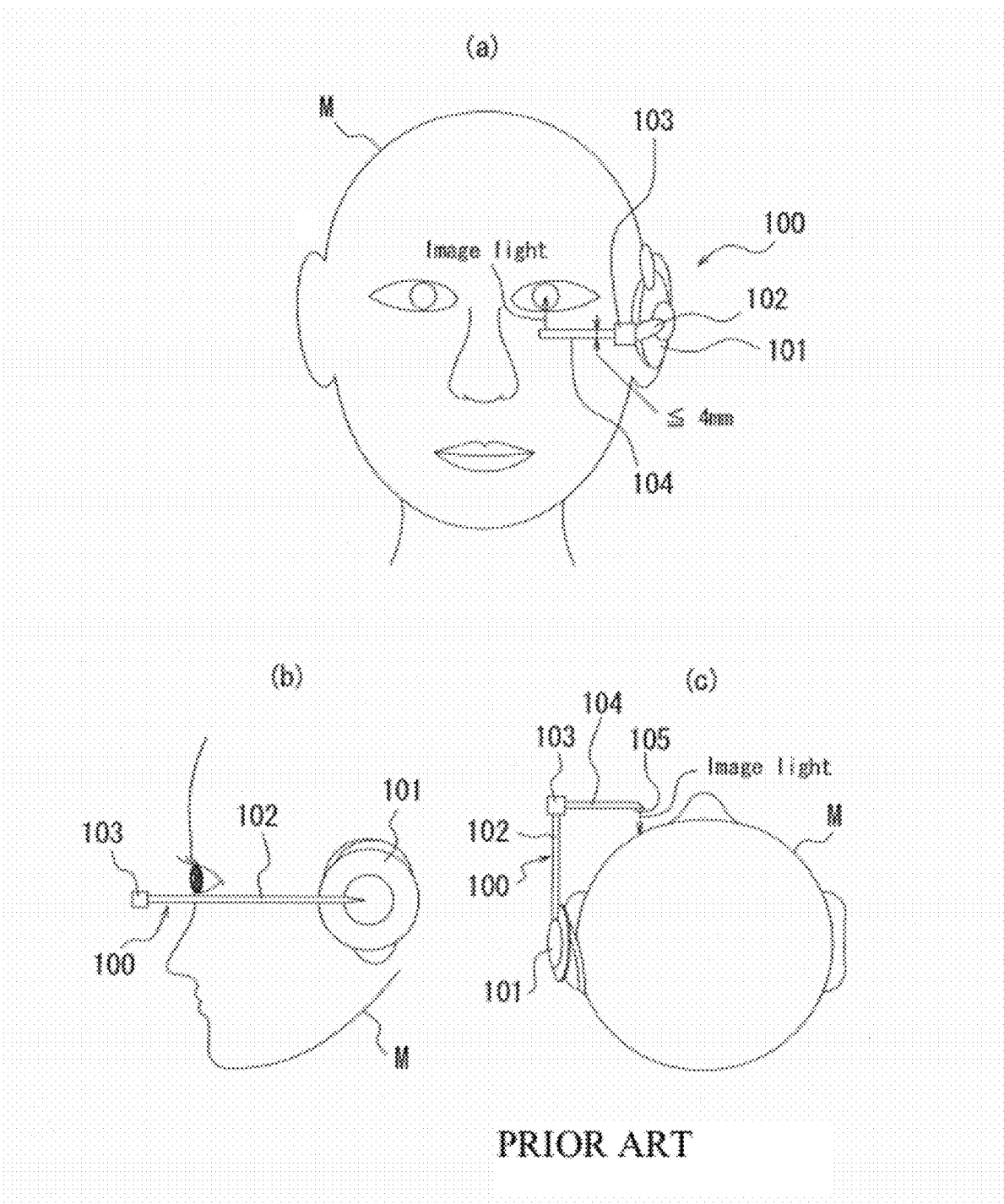
FIG. 16 is a view showing a schematic structure of a conventional head-set shape head-mounted type image display device.
Figure 17:
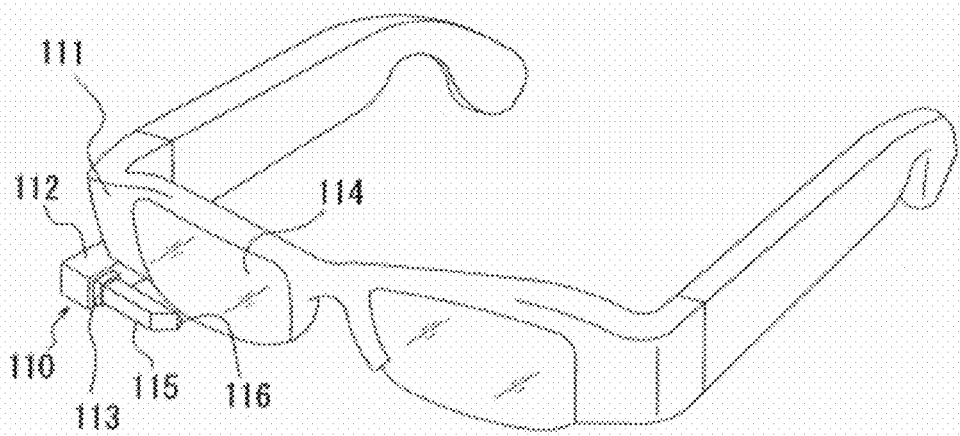
FIG. 17 is a perspective view showing a schematic structure of a conventional eyeglass shaped head-mounted type image display device.

Yet further, distances between the plural eyepiece optical units and the display positions at which respective images are displayed by the units can be varied from each other. For example, suppose the actual surrounding environment of a human being, objects in the lower area of the field of view tend to look close to the observer, while objects in the front or upper area of the field of view tend to look relatively remote. Accordingly, as shown in FIG. 15, the structure of the first embodiment can be set, for example, to position the virtual image on the upper display screen 26Ru provided by the upper eyepiece optical unit 25Ru as far as five meters ahead and the virtual image on the lower display screen 26Rd provided by the lower eyepiece optical unit 25Rd as near as 0.5 meters ahead of the observer.

Specifically, given that "a" represents the distance between a displaying element and an eyepiece optical unit, "b" represents the distance between a virtual image and the eyepiece optical unit, and "f" represents the focus distance of the eyepiece optical unit, the formula: 1/b=(1/a)−(1/f) is paraxially correct. Thus, the virtual image position can be changed by changing the distance a or the focus distance f. For example, when the distance "a" needs to be changed, the virtual image position can be set infinitely far, while the virtual image position can be set closer to the observer by decreasing by making the value of "a" smaller.

Further, in a case where the eyepiece optical unit is a single lens, the following formula (1) is satisfied paraxially, given that in the following formula "n" represents refractive index of a lens material, "r1 and r2" respectively represent a radius of curvature of each lens, and "d" represents lens thickness.

$$f = \frac{1}{(n-1)\left(\frac{1}{r1} - \frac{1}{r2}\right) + \frac{(n-1)^2 d}{nr1r2}} \quad (1)$$

Thus, the virtual image position can be set to be close to the observer by setting the focus distance f longer and the virtual image position can be set to be far from the observer by setting the focus distance f shorter, since the focus distance f of the eyepiece optical unit can be varied by changing the refractive index n, the radius of a lens curvature r, and thickness d.

Further, although each of bar-like light guiding units and the eyepiece optical units is configured to be see-through in the foregoing embodiments, it is not necessarily to configure those elements to be see-through. Yet further, the bar-like light guiding units can be omitted and displaying elements can be retained at the head-mounting unit to face each eyepiece optical unit so that virtual images can be observed. Yet further, the head-mounted type image display device according to the present invention need not be of eyeglass type and can be configured as a head set type or as a device which can be attached to/removed from an eyeglass.

The invention claimed is:

1. A head-mounted type image display device comprising:
a plurality of eyepiece optical units for each emitting image light toward a corresponding eyeball so as to display a virtual image of an image to be displayed; and
a head-mounting unit configured to support the plurality of eyepiece optical units, such that an emitting optical axis of each eyepiece optical unit substantially passes through the eyeball rolling center of the corresponding eyeball,
wherein:
the plurality of eyepiece optical units include either eyepiece optical units for left eye corresponding to left eye or eyepiece optical units for right eye corresponding to right eye in a state where the head-mounting unit is attached to the head of an observer,
the eyepiece optical units for left eye or the eyepiece optical units for right eye include an upper eyepiece optical unit and a lower eyepiece optical unit, which are supported to be apart from each other in a vertical direction,
the upper eyepiece optical unit and the lower eyepiece optical unit are arranged such that in a state where the emitting optical axis of one of the upper eyepiece optical unit and the lower eyepiece optical unit passes through a pupil of the corresponding eyeball thereof as a result of the rolling of the eyes, the emitting optical axis of the other eyepiece optical unit passes outside of the pupil of the corresponding eyeball thereof, and such that an angle formed between the emitting optical axes of the upper eyepiece optical unit and the lower eyepiece optical unit of the plurality of the eyepiece optical units is approximately 23 degrees or larger, and
a virtual image position displayed by the upper eyepiece optical unit and a virtual image position displayed by the lower eyepiece optical unit are different from each other.

2. The head-mounted type image display device of claim 1, wherein the virtual image position displayed by the upper eyepiece optical unit is farther than the virtual image position displayed by the lower eyepiece optical unit.

3. The head-mounted type image display device of claim 2, further comprising displaying elements each to display an image to be displayed, wherein the virtual image positions displayed by the upper eyepiece optical unit and the lower eyepiece optical unit are set by changing distance between the upper eyepiece optical unit or the lower eyepiece optical unit and a corresponding displaying element.

4. The head-mounted type image display device of claim 2, wherein the virtual image positions displayed by the upper eyepiece optical unit and the lower eyepiece optical unit are set by changing focal lengths of the upper eyepiece optical unit and the lower eyepiece optical unit.

5. The head-mounted type image display device of claim 2, wherein a width of projection of a sectional shape in a direction of visual axis of the observer, of each of the plurality of eyepiece optical units, is equal to or less than 4 mm.

6. The head-mounted type image display device of claim 2, wherein each of the plurality of eyepiece optical units is supported at an emitting end of a bar-like light guiding unit for guiding image light.

7. The head-mounted type image display device of claim 6, wherein a width of projection of a sectional shape in a direction of visual axis of the observer, of the plurality of bar-like light guiding units, is equal to or less than 4 mm.

8. The head-mounted type image display device of claim 2, where the head-mounting unit consists of an eyeglass frame.

* * * * *